US010814967B2

(12) United States Patent
Groninga et al.

(10) Patent No.: US 10,814,967 B2
(45) Date of Patent: Oct. 27, 2020

(54) CARGO TRANSPORTATION SYSTEM HAVING PERIMETER PROPULSION

(71) Applicant: Textron Innovations Inc., Providence, RI (US)

(72) Inventors: Kirk Landon Groninga, Fort Worth, TX (US); Daniel Bryan Robertson, Fort Worth, TX (US); Brett Rodney Zimmerman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 621 days.

(21) Appl. No.: 15/688,165

(22) Filed: Aug. 28, 2017

(65) Prior Publication Data

US 2019/0061925 A1 Feb. 28, 2019

(51) Int. Cl.
| | |
|---|---|
| *B64C 39/00* | (2006.01) |
| *B64C 11/00* | (2006.01) |
| *B64C 27/20* | (2006.01) |
| *B64D 27/02* | (2006.01) |
| *B64C 39/02* | (2006.01) |

(52) U.S. Cl.
CPC ............ *B64C 27/20* (2013.01); *B64C 11/006* (2013.01); *B64C 39/003* (2013.01); *B64C 39/024* (2013.01); *B64D 27/02* (2013.01); *B64C 2201/027* (2013.01); *B64C 2201/042* (2013.01); *B64C 2201/108* (2013.01); *B64C 2201/128* (2013.01); *B64C 2201/162* (2013.01)

(58) Field of Classification Search
CPC ... B64C 39/008; B64C 39/005; B64C 39/003; B64C 2201/162; B64C 27/20; B64C 2201/027; B64D 5/00
See application file for complete search history.

(56) References Cited

U.S. PATENT DOCUMENTS

| | | | |
|---|---|---|---|
| 1,366,016 | A * | 1/1921 | Mosher ................. B64C 39/005 244/70 |
| 1,487,228 | A | 3/1924 | Emilio |
| 1,666,132 | A | 4/1928 | Maurice et al. |
| 1,936,786 | A | 11/1933 | Albert |
| 2,402,311 | A | 6/1946 | Bissett |
| 2,444,781 | A | 7/1948 | Leonard |

(Continued)

FOREIGN PATENT DOCUMENTS

| | | | |
|---|---|---|---|
| CN | 202975811 U | * | 6/2013 |
| CN | 204674831 U | | 9/2015 |

(Continued)

*Primary Examiner* — Brian M O'Hara
(74) *Attorney, Agent, or Firm* — Lawrence Youst PLLC

(57) ABSTRACT

A cargo transportation system includes a cargo platform having an upper surface and a perimeter. A propulsion system is disposed about the perimeter of the cargo platform. The propulsion system includes a plurality of propulsion assemblies, each including a propulsion unit disposed within a housing defining an airflow channel having an air inlet for incoming air and an air outlet for outgoing air such that the outgoing air is operable to generate at least vertical lift. A power system disposed within the cargo platform provides energy to drive the propulsion system. A flight control system operably associated with the propulsion system and the power system controls flight operations of the cargo transportation system.

16 Claims, 10 Drawing Sheets

(56) References Cited

U.S. PATENT DOCUMENTS

| | | | |
|---|---|---|---|
| 2,479,125 A | 8/1949 | Leonard | |
| 2,526,941 A | 10/1950 | Meyer | |
| 2,604,276 A | 7/1952 | Huben | |
| 2,866,608 A | 12/1958 | Leonard | |
| 3,059,876 A | 10/1962 | Platt | |
| 3,159,361 A | 12/1964 | Weiland | |
| 3,178,131 A | 4/1965 | Nikolaus | |
| 3,212,735 A | 10/1965 | Nikolaus | |
| 3,285,535 A * | 11/1966 | Crowley | B60V 1/00 244/2 |
| 4,165,058 A | 8/1979 | Whitener | |
| 4,194,707 A | 3/1980 | Sharpe | |
| 5,100,080 A | 3/1992 | Servanty | |
| 5,176,338 A | 1/1993 | Silich | |
| 5,205,512 A | 4/1993 | Rumberger | |
| 5,265,827 A | 11/1993 | Gerhardt | |
| 5,289,994 A | 3/1994 | Kguilera | |
| 6,007,021 A | 12/1999 | Tsepenyuk | |
| 7,518,864 B2 | 4/2009 | Kimura | |
| 7,594,625 B2 | 9/2009 | Robertson et al. | |
| 7,641,144 B2 | 1/2010 | Kummer et al. | |
| 7,654,486 B2 | 2/2010 | Milde, Jr. | |
| 7,731,121 B2 | 6/2010 | Smith et al. | |
| 7,735,773 B2 * | 6/2010 | Schwaiger | B64C 29/0025 244/9 |
| 7,931,233 B2 | 4/2011 | Arafat et al. | |
| 8,469,308 B2 | 6/2013 | Robertson et al. | |
| 8,596,570 B1 | 12/2013 | Carambat | |
| 8,636,243 B2 | 1/2014 | Robertson | |
| 8,727,265 B2 | 5/2014 | Altmikus et al. | |
| 9,260,185 B2 | 2/2016 | Covington et al. | |
| 9,409,643 B2 | 8/2016 | Mores et al. | |
| 9,452,832 B2 | 9/2016 | Heid | |
| 9,630,712 B1 * | 4/2017 | Carmack | B64C 39/024 |
| 9,789,959 B2 | 10/2017 | Prisell | |
| 10,293,931 B2 * | 5/2019 | Robertson | B64C 39/005 |
| 2006/0054736 A1 | 3/2006 | Milde | |
| 2006/0151666 A1 | 7/2006 | VanderMey et al. | |
| 2006/0249621 A1 | 11/2006 | Stephens | |
| 2007/0200029 A1 | 8/2007 | Sullivan | |
| 2011/0121128 A1 | 5/2011 | Balkus, Jr. | |
| 2011/0315809 A1 | 12/2011 | Oliver | |
| 2012/0091257 A1 | 4/2012 | Wolff et al. | |
| 2012/0111994 A1 | 5/2012 | Kummer et al. | |
| 2012/0256042 A1 | 10/2012 | Altmikus et al. | |
| 2012/0312916 A1 | 12/2012 | Groninga | |
| 2013/0026303 A1 | 1/2013 | Wang | |
| 2013/0082139 A1 * | 4/2013 | Agajanian | B64C 3/185 244/118.2 |
| 2013/0119186 A1 | 5/2013 | Heid | |
| 2014/0048657 A1 * | 2/2014 | Lin | B64C 39/008 244/23 A |
| 2015/0048214 A1 | 2/2015 | Bockmiller et al. | |
| 2015/0183518 A1 | 7/2015 | Stuckl et al. | |
| 2015/0191245 A1 | 7/2015 | Mores et al. | |
| 2015/0197335 A1 | 7/2015 | Dekel et al. | |
| 2015/0225071 A1 | 8/2015 | Tighe | |
| 2015/0314865 A1 | 11/2015 | Bermond et al. | |
| 2016/0016652 A1 | 1/2016 | Barrett et al. | |
| 2016/0214710 A1 | 7/2016 | Brody et al. | |
| 2017/0003690 A1 | 1/2017 | Tanahashi | |
| 2017/0152935 A1 | 6/2017 | Filter et al. | |
| 2017/0361927 A1 | 12/2017 | Lavagen et al. | |

FOREIGN PATENT DOCUMENTS

| | | |
|---|---|---|
| CN | 104276284 B | 4/2016 |
| EP | 2511177 A1 | 10/2012 |
| FR | 636843 A | 4/1928 |
| FR | 880130 A | 3/1943 |
| FR | 2375090 A1 | 7/1978 |
| GB | 885663 A | 12/1961 |
| GB | 2316374 A | 2/1998 |
| JP | 2009051381 A | 3/2009 |

* cited by examiner

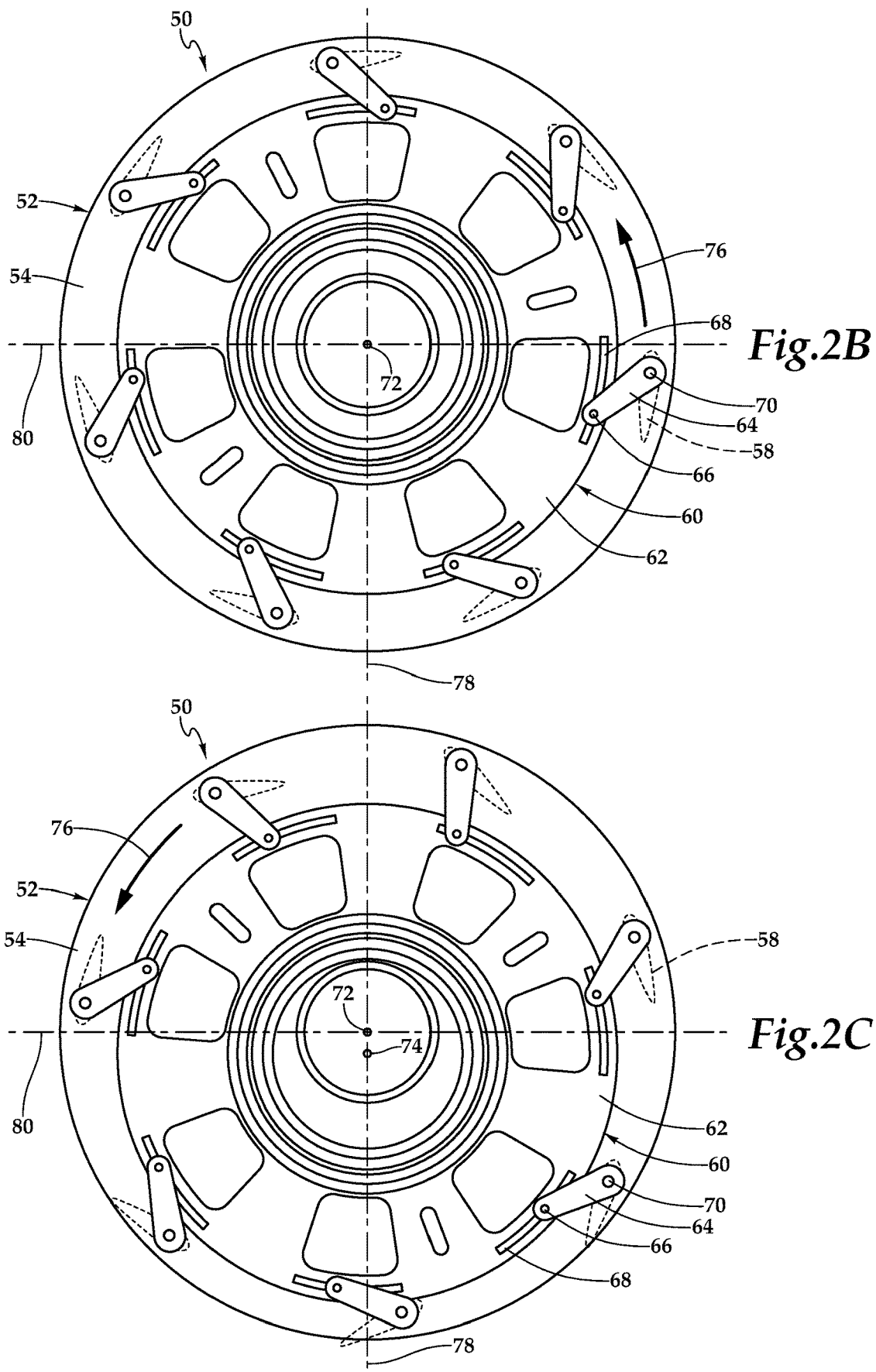

CARGO TRANSPORTATION SYSTEM HAVING PERIMETER PROPULSION

TECHNICAL FIELD OF THE DISCLOSURE

The present disclosure relates, in general, to unmanned aircraft systems operable for the transportation of cargo and, in particular, to a cargo transportation system having a generally centrally located cargo platform and a plurality of cross-flow fans positioned about the perimeter of the platform to provide propulsion.

BACKGROUND

Vertical takeoff and landing (VTOL) aircraft are capable of taking off, hovering and landing vertically. One example of a VTOL aircraft is a helicopter which is a rotorcraft having one or more rotors that provide vertical lift and directional thrust to the aircraft. As such, the rotors not only enable vertical takeoff, hovering and vertical landing, but also enable, forward, backward and lateral flight. These attributes make helicopters highly versatile for use in congested, isolated or remote areas where fixed-wing aircraft may be unable to takeoff and land. Another example of a VTOL aircraft is a tiltrotor aircraft that generates vertical lift and forward thrust using proprotors that are typically coupled to nacelles mounted near the ends of a fixed wing. The nacelles or a portion thereof rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust.

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS may be used in military, commercial, scientific, recreational and other applications. For example, military applications may include intelligence, surveillance and reconnaissance missions as well as attack missions. Civil applications may include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

SUMMARY

In a first aspect, the present disclosure is directed to a cargo transportation system that includes a cargo platform having an upper surface and a perimeter. A propulsion system is disposed about the perimeter of the cargo platform. The propulsion system includes a plurality of propulsion assemblies, each including a propulsion unit disposed within a housing defining an airflow channel having an air inlet for incoming air and an air outlet for outgoing air such that the outgoing air is operable to generate vertical lift. A power system disposed within the cargo platform provides energy to drive the propulsion system. A flight control system operably associated with the propulsion system and the power system controls the flight operations of the cargo transportation system.

In some embodiments, the upper surface of the cargo platform may be a generally planar upper surface. In certain embodiments, a plurality of tie down anchors may be coupled to the cargo platform. In some embodiments, the propulsion units may be cross-flow fans such as variable thrust cross-flow fans, variable pitch cross-flow fans, variable speed cross-flow fans or combinations thereof. The variable pitch cross-flow fans may include a cross-flow fan assembly having a longitudinal axis and including first and second driver plates having a plurality of blades rotatably mounted therebetween such that the blades are disposed radially outwardly from the longitudinal axis and are operable to travel in a generally circular path about the longitudinal axis and moveable between a plurality of pitch angle configurations. A control assembly operably associated with the cross-flow fan assembly is operable to change the pitch angle configuration of the blades to generate the variable thrust. The variable speed cross-flow fans may include a cross-flow fan assembly having a longitudinal axis and including first and second driver plates having a plurality of blades fixably mounted therebetween such that the blades are disposed radially outwardly from the longitudinal axis and are operable to travel in a generally circular path when the cross-flow fan assembly rotates about the longitudinal axis.

In certain embodiments, for each propulsion assembly, the air inlet and the air outlet of the airflow channel may be generally inline. In other embodiments, for each propulsion assembly, the air inlet and the air outlet of the airflow channel may be angularly offset. In further embodiments, for at least one of the propulsion assemblies, the air inlet and the air outlet of the airflow channel may be generally inline and for at least another of the propulsion assemblies, the air inlet and the air outlet of the airflow channel may be angularly offset. In some embodiments, the propulsion assemblies may be thrust vectoring propulsion assemblies. In certain embodiments, one or more propulsors that are coupled to the cargo platform may be operable to generate forward thrust. In some embodiments, the power system may be an electric power system, an internal combustion power system, a hybrid internal combustion and electric power system or a hybrid internal combustion and hydraulic power system.

In a second aspect, the present disclosure is directed to a cargo transportation system that includes a cargo platform having an upper surface and a perimeter. A propulsion system is disposed about the perimeter of the cargo platform. The propulsion system includes a plurality of thrust vectoring propulsion assemblies, each including a variable pitch cross-flow fan disposed within a housing defining an airflow channel having an air inlet for incoming air and an air outlet for outgoing air that are generally inline such that the outgoing air is operable to generate vertical lift and directional thrust. A power system disposed within the cargo platform provides energy to drive the propulsion system. A flight control system operably associated with the propulsion system and the power system controls the flight operations of the cargo transportation system.

In a third aspect, the present disclosure is directed to a cargo transportation system that includes a cargo platform having an upper surface and a perimeter. A propulsion system is disposed about the perimeter of the cargo platform. The propulsion system includes a plurality of thrust vectoring propulsion assemblies, each including a variable speed cross-flow fan disposed within a housing defining an airflow channel having an air inlet for incoming air and an air outlet for outgoing air that are angularly offset such that the outgoing air operable to generate vertical lift and directional thrust. A power system disposed within the cargo platform provides energy to drive the propulsion system. A flight control system operably associated with the propulsion system and the power system controls the flight operations of the cargo transportation system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are various views of a variable pitch cross-flow fan for use in a cargo transportation system having perimeter propulsion in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1:
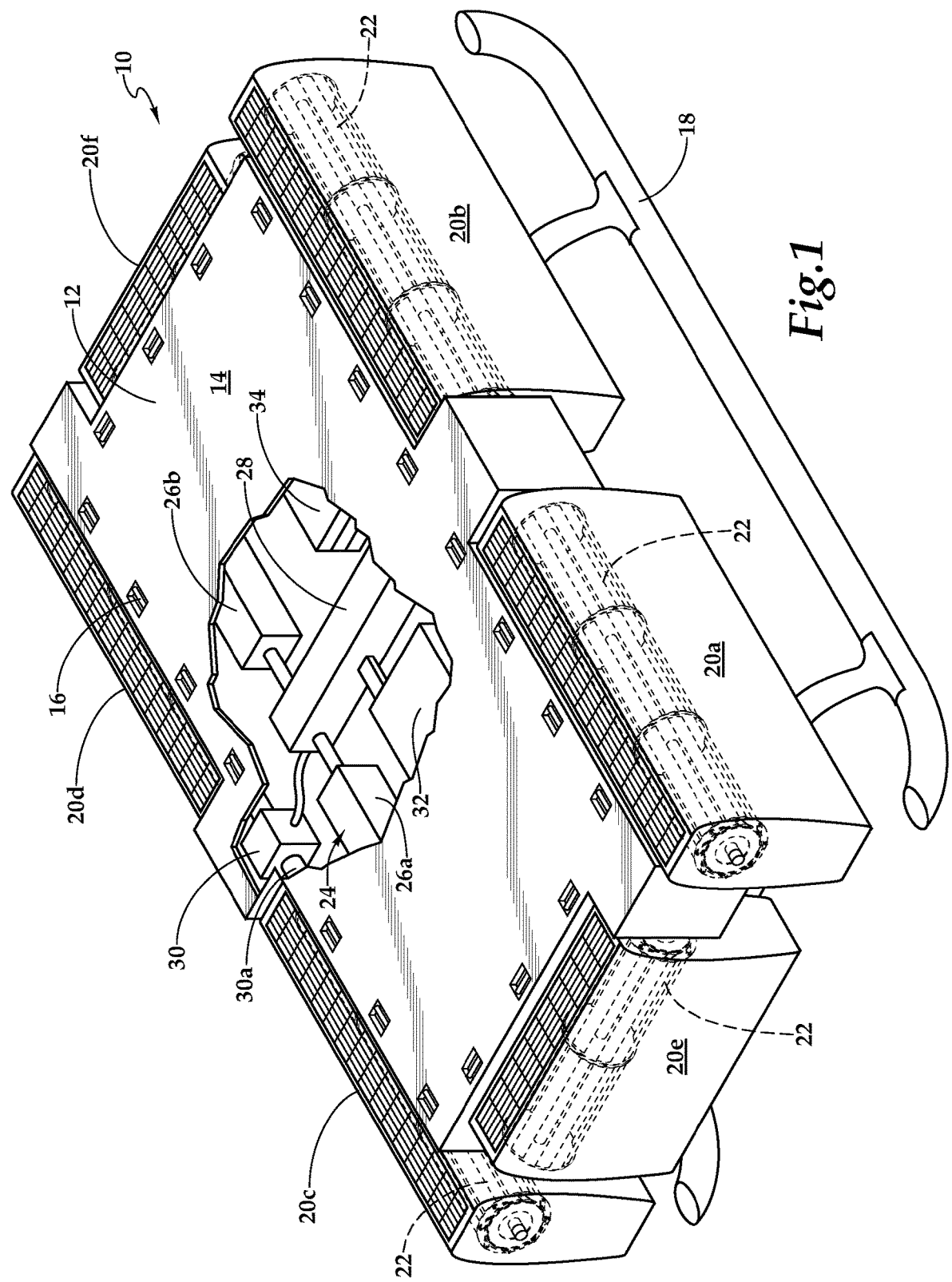
FIG. 1 is a schematic illustration of a cargo transportation system having perimeter propulsion in accordance with embodiments of the present disclosure.

Referring to FIG. 1 in the drawings, a cargo transportation system is schematically illustrated and referred to herein as aircraft 10. Aircraft 10 is preferably an unmanned aircraft system (UAS), also known as an unmanned aerial vehicle (UAV) or a drone, that is self-powered, does not carry a human operator, uses aerodynamic forces to provide vehicle lift, is autonomously and/or remotely operated and may carry a payload. In addition, aircraft 10 is a VTOL aircraft capable of vertical takeoff and landing as well as hovering, lateral flight and forward/aft flight. Aircraft 10 includes a cargo platform 12 depicted as having generally planar upper surface 14 operable the receive and support cargo items including military pallets, in which case, cargo platform 12 may preferably be 88 inches wide by 108 inches long. In the illustrated embodiment, cargo platform 12 includes a plurality of tie down anchors 16 to which straps, ropes, chains, cargo hooks or other tie down systems may be coupled to secure cargo to upper surface 14 of cargo platform 12. In the illustrated embodiment, aircraft 10 includes landing skids 18 which are preferably coupled to a lower surface of cargo platform 12.

Aircraft 10 includes a propulsion system that is disposed about the perimeter of cargo platform 12. In the illustrated embodiment, the propulsion system includes a plurality of propulsion assemblies including port propulsion assemblies 20a, 20b, starboard propulsion assemblies 20c, 20d, front propulsion assembly 20e and aft propulsion assembly 20f that provide vertical lift and directional thrust for aircraft 10. Each of the propulsion assemblies includes a plurality of propulsion units depicted as cross-flow fans 22. In the illustrated embodiment, port propulsion assemblies 20a, 20b and starboard propulsion assemblies 20c, 20d each include three cross-flow fans 22 and front propulsion assembly 20e and aft propulsion assembly 20f each include two cross-flow fans 22.

As illustrated, the propulsion assemblies are generally symmetrically positioned about the perimeter of cargo platform 12. This arrangement is beneficial for aircraft stability in VTOL operations including pitch, roll and yaw control. For example, pitch control is preferably achieved by varying the thrust output of front propulsion assembly 20e and/or aft propulsion assembly 20f. Roll control is preferably achieved by varying the thrust output of port propulsion assemblies 20a, 20b and/or starboard propulsion assemblies 20c, 20d. Yaw control is preferably achieved by varying the thrust vector of port propulsion assemblies 20a, 20b and/or starboard propulsion assemblies 20c, 20d. This arrangement is also beneficial for directional flight control including forward, aft and lateral flight operations. For example, forward and aft directional flight are preferably achieved by varying the thrust vector of front propulsion assembly 20e and/or aft propulsion assembly 20f. Lateral directional flight is preferably achieved by varying the thrust vector of port propulsion assemblies 20a, 20b and/or starboard propulsion assemblies 20c, 20d.

Even though the propulsion system of aircraft 10 has been depicted with a particular number of propulsion assemblies in a particular configuration with a particular number of propulsion units, it should be understood by those having ordinary skill in the art that an aircraft of the present disclosure could have a propulsion system with other numbers of propulsion assemblies in other configurations having other numbers of propulsion units. For example, a propulsion system for an aircraft of the present disclosure could have greater than or less than six total propulsion assemblies, greater than or less than two port propulsion assemblies, greater than or less than two starboard propulsion assemblies, greater than one front propulsion assembly, greater than one aft propulsion assembly and/or certain propulsion assemblies may have greater than three or less than two propulsion units.

Aircraft 10 includes a power system 24 that is preferably disposed within cargo platform 12. In the illustrated embodiment, power system 24 includes redundant internal combustion engines, such as rotary or reciprocating engines, depicted as internal combustion engines 26a, 26b that operate on liquid fuel, such as jet fuel, gasoline or diesel fuel, stored in one or more fuel tanks (not illustrated). In operation, one or both of internal combustion engines 26a, 26b are used to drive an electric generator 28 to produce electrical energy. The electrical energy may be fed directly to each of a plurality of electric motors, only electric motor 30 having drive shaft 30a that drives starboard propulsion assemblies 20c, 20d being visible in the drawing. Alternatively or additionally, electrical energy may be fed to one or more batteries 32 for storage. It is noted that similar electric motors are used to drive port propulsion assemblies 20a, 20b, front propulsion assembly 20e and aft propulsion assembly 20f. This type of hybrid internal combustion and electric power system may enable greater endurance for aircraft 10 compared to an entirely electric system as long as the energy density of liquid fuel exceeds that of batteries.

In other embodiments, power system 24 of aircraft 10 may include one or more internal combustion engines that directly drive the propulsion assemblies via suitable transmissions. As another alternative, power system 24 of aircraft 10 may include one or more internal combustion engines that drive one or more hydraulic pumps, which supply high-pressure hydraulic fluid to hydraulic motors that drive the propulsion assemblies. As yet another alternative, power system 24 of aircraft 10 may be entirely electric wherein one or more batteries supply electrical energy to the electric motors that drive the propulsion assemblies.

In the illustrated embodiment, aircraft 10 has a flight control system 34 that is housed within cargo platform 12. Flight control system 34, such as a digital flight control system, is preferably a redundant flight control system and more preferably a triply redundant flight control system including three independent flight control computers. Use of triply redundant flight control system 34 improves the overall safety and reliability of aircraft 10 in the event of a failure in flight control system 34. Flight control system 34 preferably includes non-transitory computer readable storage media including a set of computer instructions executable by one or more processors for controlling the operation of aircraft 10. Flight control system 34 may be implemented on one or more general-purpose computers, special purpose computers or other machines with memory and processing capability. For example, flight control system 34 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 34 may be a microprocessor-based system operable to execute program code in the form of machine-executable instructions. In addition, flight control system 34 may be selectively connectable to other computer systems via a proprietary encrypted network, a public encrypted network, the Internet or other suitable communication network that may include both wired and wireless connections.

Flight control system 34 communicates via a wired and/or wireless protocol with power system 24 and propulsion assemblies 20a-20f. For example, flight control system 34 sends flight commands to individually and independently control the operations of each propulsion assembly 20a-20f. Flight control system 34 may autonomously control some or all aspects of flight operation for aircraft 10. Flight control system 34 may also be operable to communicate with one or more remote stations, via a wireless communications protocol. The remote stations may be operable to receive flight data from and provide commands to flight control system 34 to enable remote flight control over some or all aspects of flight operation for aircraft 10.

Figure 2A:
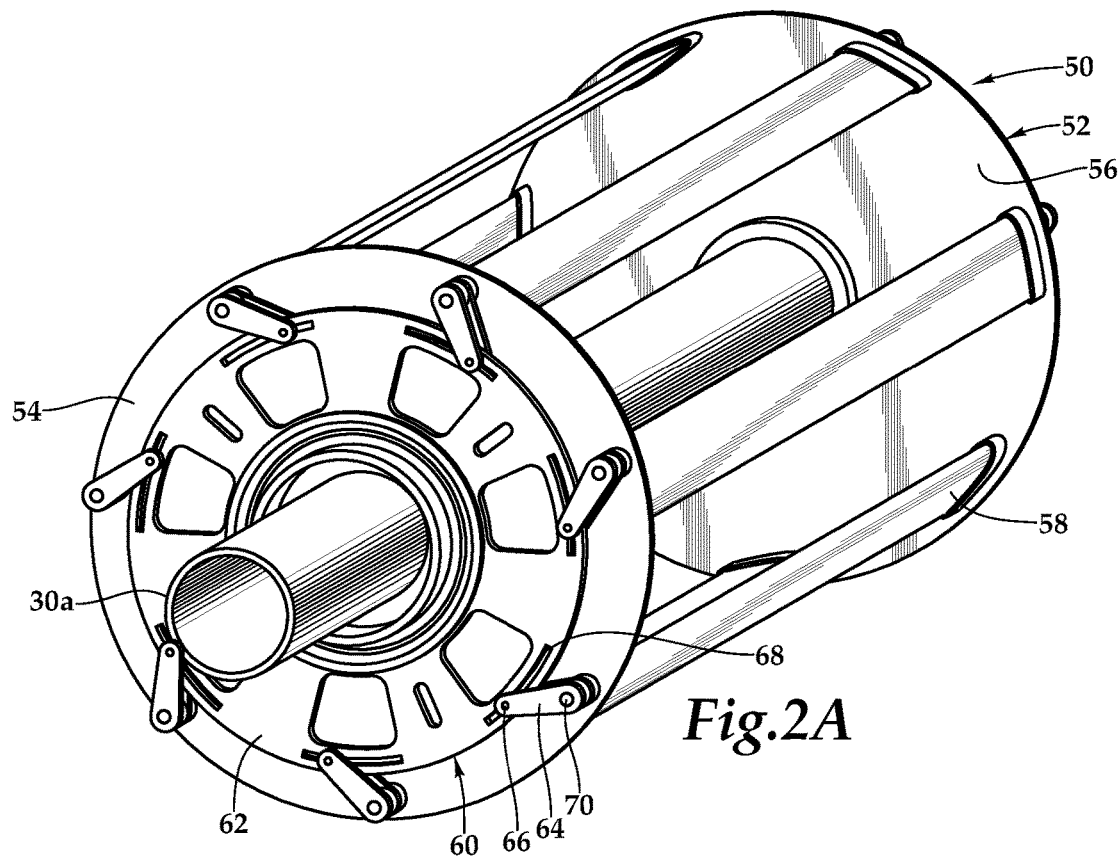

Referring to FIGS. 2A-2C of the drawings, a propulsion unit for use in a propulsion assembly of the present disclosure is depicted as a variable thrust and variable pitch cross-flow fan 50. Cross-flow fan 50 includes a cross-flow fan assembly 52 including driver plates 54, 56 that are coupled to a drive shaft 30a and are rotatable about a longitudinal axis. Drive shaft 30a is part of a drive system used to provide rotational energy to cross-flow fan assembly 52 and is preferably coupled to an electric motor, such as electric motor 30, and controlled by flight control system 34. Cross-flow fan assembly 52 includes a plurality of blades 58 that are each rotatably coupled between driver plates 54, 56. As illustrated, blades 58 are disposed radially outwardly from the longitudinal axis such that blades 58 follow a generally circular path of travel when cross-flow fan assembly 52 rotates about the longitudinal axis. Cross-flow fan 50 includes a control assembly 60 that is coupled to each blade 58. Control assembly 60 is part of an actuation system used to adjust the thrust output of cross-flow fan 50 and is preferably coupled to an electrically operated actuator controlled by flight control system 34. In the illustrated embodiment, control assembly 60 includes a control cam 62 that is rotatable with and translatable relative to cross-flow fan assembly 52. Control assembly 60 also includes a plurality of linkages 64 that are slidably coupled to control cam 62 via follower pins 66 in follower slots 68 of driver plate 54 and fixably coupled to blades 58 via driver pins 70 that extend through linkage holes (not visible) of driver plate 54.

When cross-flow fan assembly 52 is rotated by drive shaft 30a and control cam 62 is positioned concentrically with cross-flow fan assembly 52, as best seen in FIG. 2B, follower pins 66 do not move relative to follower slots 68 and blades 58 do not rotate relative to driver plates 54, 56. In this state, blades 58 are in a neutral configuration wherein blades 58 have a substantially zero pitch during the entire revolution of cross-flow fan assembly 52. In this neutral configuration, blades 58 have a substantially zero angle of attack and therefore produce little or no thrust. To produce thrust, blades 58 are rotated relative to driver plates 54, 56 in response to shifting control cam 62 down relative to cross-flow fan assembly 52, as best seen in FIG. 2C. When control cam 62 is position eccentrically relative to cross-flow fan assembly 52 and cross-flow fan assembly 52 is rotated by drive shaft 30a, follower pins 66 cyclically slide within follower slots 68 which cyclically pivots linkages 64 and cyclically rotates blades 58 relative to driver plates 54, 56. In the illustrated configuration, the center of rotation of control cam 62 has been shifted down from a concentric location 72 to an eccentric location 74. In this configuration, as each blade 58 follows the generally circular path of travel, the blades transition between positive pitch, zero pitch, negative pitch, zero pitch and back to positive pitch during each revolution of cross-flow fan assembly 52.

As illustrated, blades 58 have an airfoil cross section and travel in a counterclockwise direction as indicated by arrow 76. As blades 58 approach the top of cross-flow fan assembly 52, in FIG. 2C, the blades have progressively greater positive pitch reaching a maximum positive pitch proximate axis 78. Thereafter, as blades 58 retreat from the top of cross-flow fan assembly 52, the blades have progressively lesser positive pitch reaching zero pitch proximate axis 80. As blades 58 approach the bottom of cross-flow fan assembly 52, the blades have progressively greater negative pitch reaching a maximum negative pitch proximate axis 78. Thereafter, as blades 58 retreat from the bottom of cross-flow fan assembly 52, the blades have progressively lesser negative pitch, reaching zero pitch proximate axis 80. Each blade 58 repeats this cycle on each revolution of cross-flow fan assembly 52. It should be noted that while each blade 58 may have a different pitch angle at any given time, the collective positions of all blades 58 may be referred to herein as the pitch angle configuration of cross-flow fan assembly 52. Thus, movement of control cam 62 is operable to change the pitch angle configuration of blades 58 to selectively generate thrust in a range of desired magnitudes from zero (see FIG. 2B) to one hundred percent (see FIG. 2C) of the maximum thrust output, while operating cross-flow fan assembly 52 at a constant speed. Thus, even though only two pitch angle configurations of blades 58 have been shown in FIGS. 2B-2C, it should be understood by those having ordinary skill in the art that blades 58 may have an infinite number of pitch angle configurations producing an infinite number of thrust magnitudes, by moving control cam 62 along an infinite number of possible points along axis 78 between its minimum location (see FIG. 2B) and its maximum location (see FIG. 2C).

Figure 3:
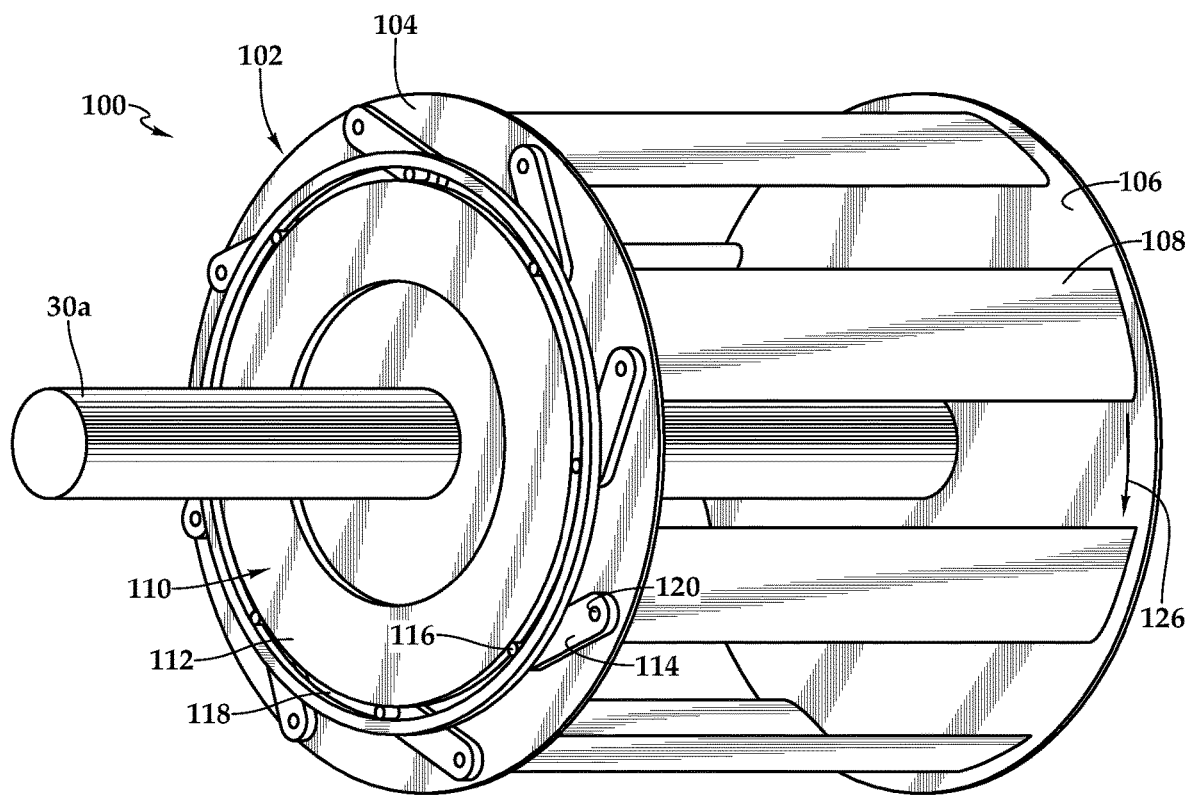
FIG. 3 is a perspective view of a variable pitch cross-flow fan for use in a cargo transportation system having perimeter propulsion in accordance with embodiments of the present disclosure.

In the illustrated embodiment, each blade 58 forms an acute angle with respect to the linkage 64 to which it is coupled. In this configuration, when control cam 62 is shifted down from concentric location 72 to eccentric location 74, airflow through cross-flow fan assembly 52 is from the top to the bottom, which generates vertical lift. The magnitude of the thrust generated by variable pitch cross-flow fan 50 is determined by factors including the magnitude of the eccentricity applied to control cam 62, the rotational speed of cross-flow fan assembly 52, the cross sectional shape of blades 58, the pitch cycle of blades 58, the number of blades 58 and other factors known to those having ordinary skill in the art. It should be noted that the variable pitch cross-flow fans of the present disclosure may take a variety of forms and may operate in a variety of ways. For example, as illustrated in FIG. 3 of the drawings, a propulsion unit for use in a propulsion assembly of the present disclosure is depicted as variable thrust and variable pitch cross-flow fan 100. In this embodiment, cross-flow fan 100 rotates in the clockwise direction, the blades form obtuse angles with respect to the linkages, the control cam does not rotate with the cross-flow fan assembly and the control cam is shifted in the opposite direction in which thrust is generated.

Cross-flow fan 100 includes a cross-flow fan assembly 102 including driver plates 104, 106 which are coupled to drive shaft 30a and are rotatable about a longitudinal axis. Cross-flow fan assembly 102 includes a plurality of blades 108 that are each rotatably coupled between driver plates 104, 106. As illustrated, blades 108 are disposed radially outwardly from the longitudinal axis such that blades 108 follow a generally circular path of travel when cross-flow fan assembly 102 rotates about the longitudinal axis. Cross-flow fan 100 includes a control assembly 110 that is coupled to each blade 108. Control assembly 110 is part of an actuation system used to adjust the thrust output of cross-flow fan 100 and is preferably coupled to an electrically operated actuator controlled by flight control system 34. In the illustrated embodiment, control assembly 110 includes a control cam 112 that is translatable relative to cross-flow fan assembly 102 but does not rotate with cross-flow fan assembly 102. Control assembly 110 also includes a plurality of linkages 114 that are slidably coupled to control cam 112 via follower pins 116 in a continuous follower slot 118 of driver plate 104 and fixably coupled to blades 108 via driver pins 120 that extend through linkage holes (not visible) of driver plate 104.

When cross-flow fan assembly 102 is rotated by drive shaft 30a and control cam 112 is positioned concentrically with cross-flow fan assembly 102, follower pins 116 move through continuous follower slot 118 in a concentric manner. In this state, blades 108 are in a neutral configuration wherein blades 108 have a substantially zero pitch during the entire revolution of cross-flow fan assembly 102. In this neutral configuration, blades 108 have a substantially zero angle of attack and therefore produce little or no thrust. To produce thrust, blades 108 are rotated relative to driver plates 104, 106 in response to shifting control cam 112 up relative to cross-flow fan assembly 102. When control cam 112 is position eccentrically relative to cross-flow fan assembly 102 and cross-flow fan assembly 102 is rotated by drive shaft 30a, follower pins 116 travel in an eccentric path through continuous follower slot 118, which cyclically pivots linkages 114 and cyclically rotates blades 108 relative to driver plates 104, 106. In this configuration, as each blade 108 follows the generally circular path of travel, the blades transition between positive pitch, zero pitch, negative pitch, zero pitch and back to positive pitch during each revolution of cross-flow fan assembly 102, in a manner similar to that described with reference to cross-flow fan 50. As illustrated, blades 108 have an airfoil cross section and travel in a clockwise direction as indicated by arrow 126. In addition, each blade 108 forms an obtuse angle with respect to the linkage 114 to which it is coupled. In this configuration, when control cam 112 is shifted up from the concentric location, airflow through cross-flow fan assembly 102 is from the top to the bottom, which generates a vertical lift.

Even though the propulsion units of the propulsion system of the present disclosure have been described and depicted as variable thrust and variable pitch cross-flow fans, it should be understood by those having ordinary skill in the art, that other types of propulsion units could alternatively be used in the propulsion system of the present disclosure including, but not limited to, axial fans. Such axial fans may include a central hub with a plurality of vanes extending radially outward therefrom. The vanes may have a leading edge, a trailing edge and an outer edge such that rotation of the vanes about the central hub generates a thrust in the desired direction. Preferably, such axial fans include an electrical motor that is powered by the electrical system of the aircraft of the present disclosure. In addition, such axial fans preferably include suitable sensors, controllers and communications such that the flight control system of the aircraft of the present disclosure is operable to individually and independently control such axial fans to produce the desired thrust.

Figure 4:
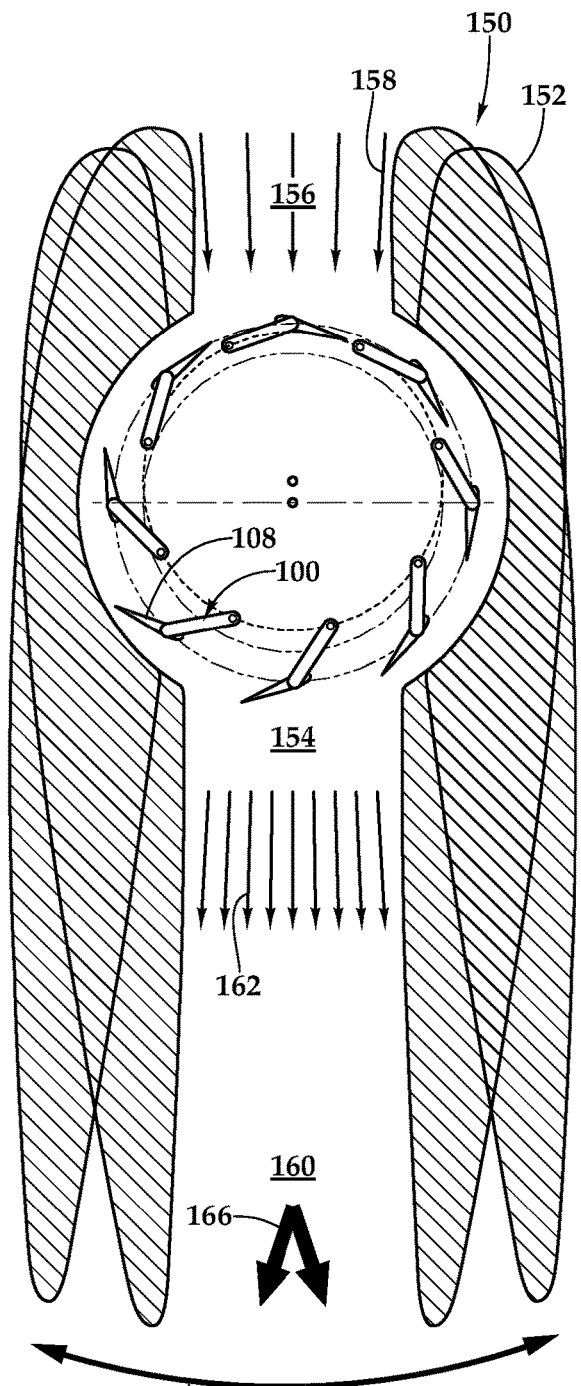
FIG. 4 is a cross sectional view of a propulsion assembly for use in a cargo transportation system in accordance with embodiments of the present disclosure.

Referring next to FIG. 4 of the drawings, a thrust vectoring operation of a propulsion assembly 150 will now be described. Propulsion assembly 150 includes a housing 152 that defines an airflow channel 154 having an air inlet 156 for incoming air 158 and an air outlet 160 for outgoing air 162. As discussed herein, aircraft 10 preferably includes a propulsion system having a plurality of propulsion assemblies 150 each including a plurality of propulsion units, such as cross-flow fans 100. The propulsion assemblies 150 are preferably individually and independently controlled by flight control system 34. For example, the flight control system is operable to control the rotational speed of each cross-flow fan assembly and the eccentricity of each control assembly during operation of each cross-flow fan 100. Thus, the flight control system is operable to individually and independently control the magnitude of the thrust output of each cross-flow fan 100. In addition, flight control system 34 is operable to control the position of housing 152 relative to cross-flow fan 100, as indicated by arrow 164 and the dual images of housing 152. Rotating housing 152 relative to cross-flow fan 100 changes the direction of airflow channel 154 and thus the direction of outgoing air 162 enabling thrust vectoring, as indicated by arrows 166. By individually and independently controlling the magnitude of the thrust output and the direction of the thrust vector of each cross-flow fan 100, flight control system 34 is operable to control vertical lift and directional thrust for aircraft 10. In addition, the thrust vectoring capability makes aircraft 10 more stable, responsive and maneuverable in VTOL and directional flight, as discussed herein.

Figure 5:
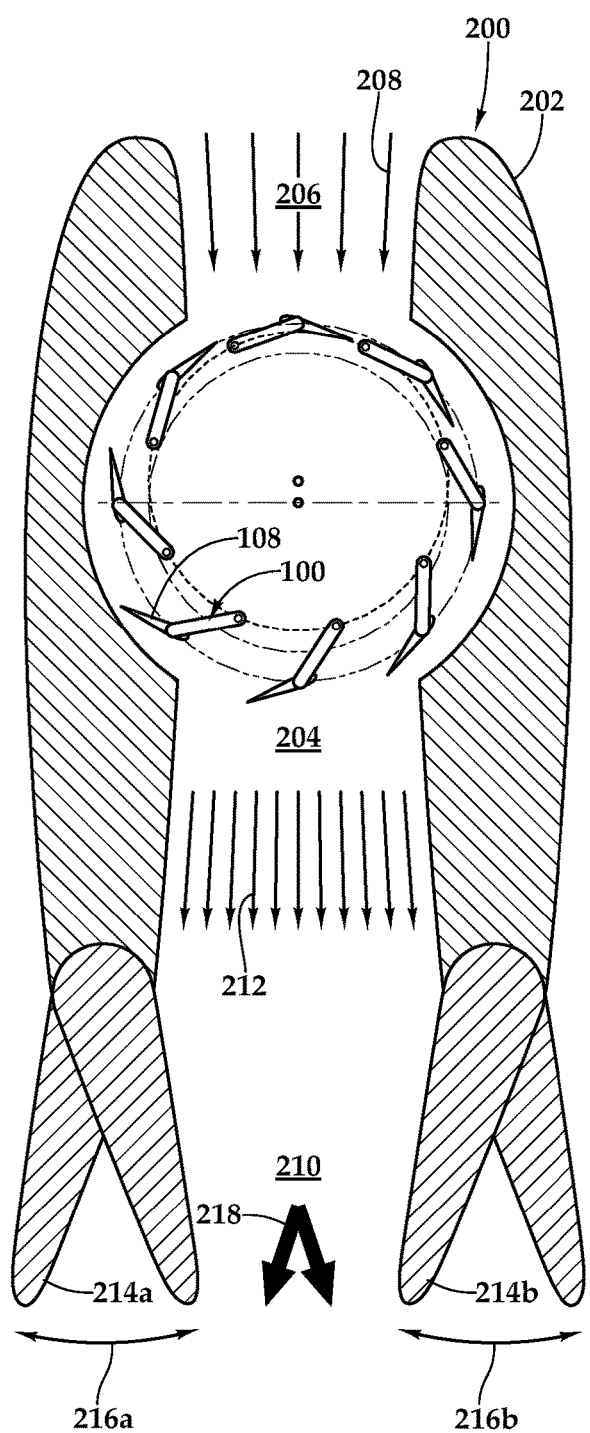
FIG. 5 is a cross sectional view of a propulsion assembly for use in a cargo transportation system in accordance with embodiments of the present disclosure.

Referring next to FIG. 5 of the drawings, a thrust vectoring operation of a propulsion assembly 200 will now be described. Propulsion assembly 200 includes a housing 202 that defines an airflow channel 204 having an air inlet 206 for incoming air 208 and an air outlet 210 for outgoing air 212. As discussed herein, aircraft 10 preferably includes a propulsion system having a plurality of propulsion assemblies each including a plurality of propulsion units, such as cross-flow fans 100. The propulsion assemblies are preferably individually and independently controlled by flight control system 34. For example, the flight control system is operable to control the rotational speed of each cross-flow fan assembly and the eccentricity of each control assembly during operation of each cross-flow fan 100. Thus, the flight control system is operable to individually and independently control the magnitude of the thrust output of each cross-flow fan 100. In addition, flight control system 34 is operable to control the position of flaperons 214a, 214b located proximate air outlet 210. Flaperons 214a, 214b are rotatable, as indicated by arrow 216a, 216b, to direct outgoing air 212 from each cross-flow fan 100 enabling thrust vectoring, as indicated by arrows 218. By individually and independently controlling the magnitude of the thrust output and the direction of the thrust vector of each cross-flow fan 100, flight control system 34 is operable to control vertical lift and directional thrust for aircraft 10. In addition, the thrust vectoring capability makes aircraft 10 more stable, responsive and maneuverable in VTOL and directional flight, as discussed herein.

Figure 6C:
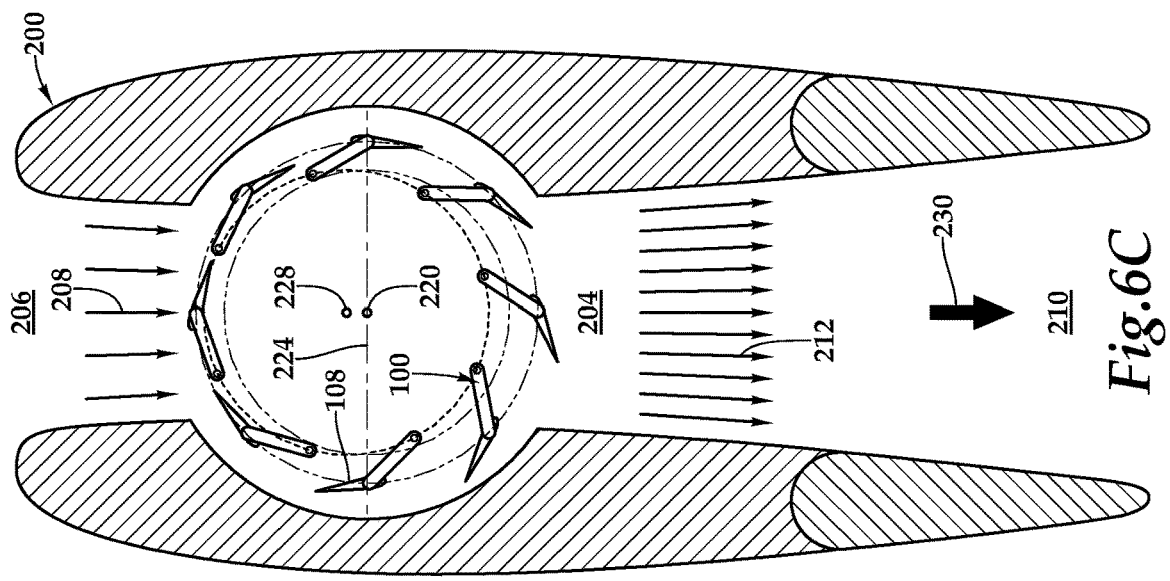
FIGS. 6A-6C are cross sectional views of a propulsion assembly for use in a cargo transportation system in accordance with embodiments of the present disclosure.
Figure 6B:
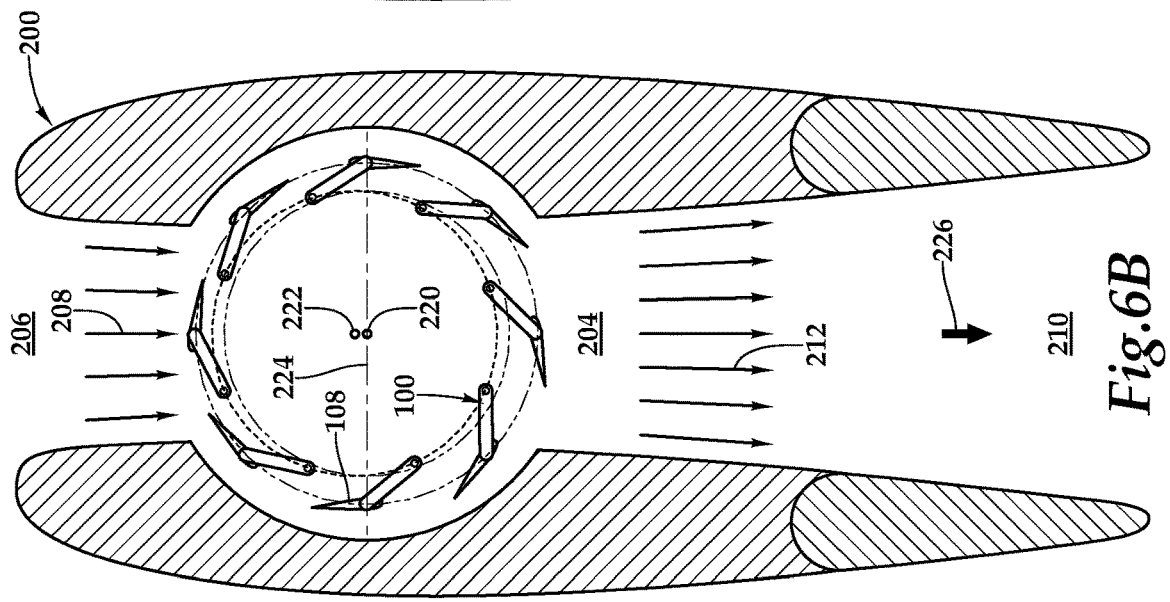
Figure 6A:
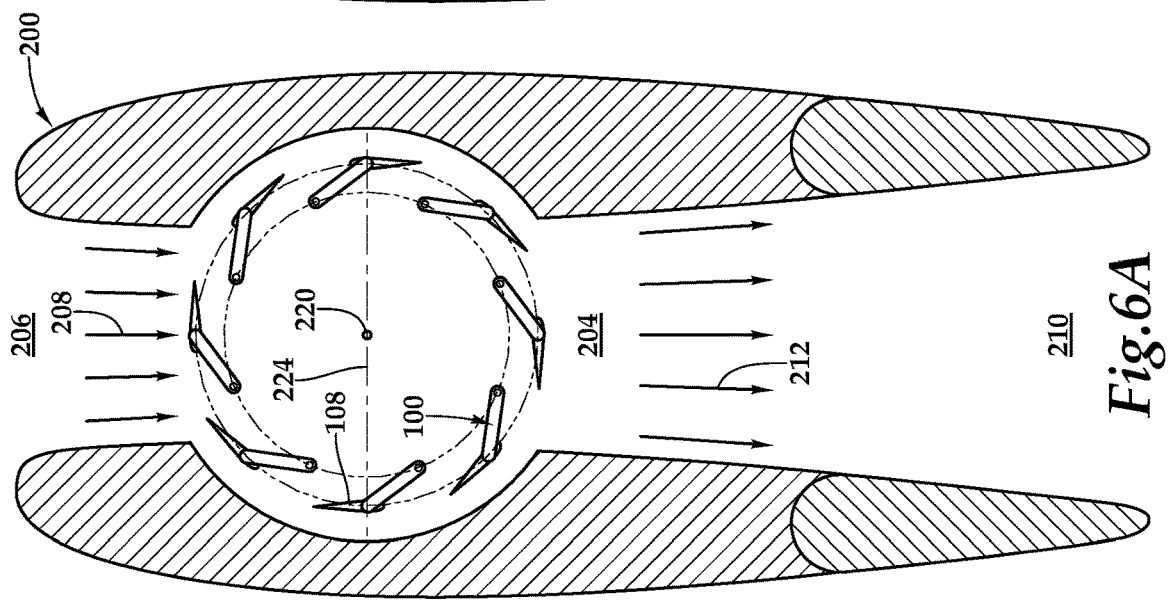

Referring next to FIGS. 6A-6C of the drawings, a variable thrust operation of a propulsion assembly 200 will now be described. In the illustrated embodiment, variable pitch cross-flow fan 100 is disposed within airflow channel 204 between air inlet 206 and air outlet 210. As best seen in FIG. 6A, cross-flow fan 100 is rotating in the counter clockwise direction with control cam 112 (see FIG. 3) positioned in concentric location 220. In this state, blades 108 are in a neutral configuration wherein blades 108 have a substantially zero pitch during the entire revolution of cross-flow fan 100. In this neutral configuration, blades 108 have a substantially zero angle of attack and therefore produce little or no thrust. Nonetheless, some air may pass through cross-flow fan 100 as indicated by low-density incoming air 208 and low-density outgoing air 212. This blade pitch configuration of cross-flow fan 100 is suitable for pre-flight and post-flight operations of aircraft 10, such as warm up and cool down operations.

As best seen in FIG. 6B, control cam 112 (see FIG. 3) has been shifted up from concentric location 220 to eccentric location 222. In this configuration, as each blade 108 follows the generally circular path of travel, the blades transition between positive pitch, zero pitch, negative pitch, zero pitch and back to positive pitch during each revolution of cross-flow fan 100. As blades 108 approach air inlet 206, the blades have progressively greater positive pitch reaching a maximum positive pitch proximate the upper apex. Thereafter, as blades 108 retreat from air inlet 206, the blades have progressively lesser positive pitch reaching zero pitch proximate axis 224. As blades 108 approach air outlet 210, the blades have progressively greater negative pitch reaching a maximum negative pitch proximate the lower apex. Thereafter, as blades 108 retreat from air outlet 210, the blades have progressively lesser negative pitch, reaching zero pitch proximate axis 224. Each blade 108 repeats this cycle on each revolution of cross-flow fan 100. As blades 108 follow the generally circular path of travel with the cyclically varying angle of attack described herein, air passes through cross-flow fan 100 as indicated by low-density incoming air 208 and medium-density outgoing air 212 with the resultant medium thrust indicated by arrow 226.

As discussed herein, the magnitude of thrust 226 generated by cross-flow fan 100 is determined by factors including the magnitude of the eccentricity applied to control cam 112 and the rotational speed of variable thrust cross-flow fan 100, both of which are controlled by flight control system 34. As best seen in FIG. 6C, control cam 112 (see FIG. 3) has been shifted up from eccentric location 222 to greater eccentric location 228. In this configuration, as each blade 108 follows the generally circular path of travel, the blades transition between positive pitch, zero pitch, negative pitch, zero pitch and back to positive pitch during each revolution of cross-flow fan 100. As blades 108 approach air inlet 206, the blades have progressively greater positive pitch reaching a maximum positive pitch proximate the upper apex. Thereafter, as blades 108 retreat from air inlet 206, the blades have progressively lesser positive pitch reaching zero pitch proximate axis 224. As blades 108 approach air outlet 210, the blades have progressively greater negative pitch reaching a maximum negative pitch proximate the lower apex. Thereafter, as blades 108 retreat from air outlet 210, the blades have progressively lesser negative pitch, reaching zero pitch proximate axis 224. Each blade 108 repeats this cycle on each revolution of cross-flow fan 100. As blades 108 follow the generally circular path of travel with the cyclically varying angle of attack described herein, air passes through cross-flow fan 100 as indicated by low-density incoming air 208 and high-density outgoing air 212 with the resultant large thrust indicated by arrow 230.

Figure 7:
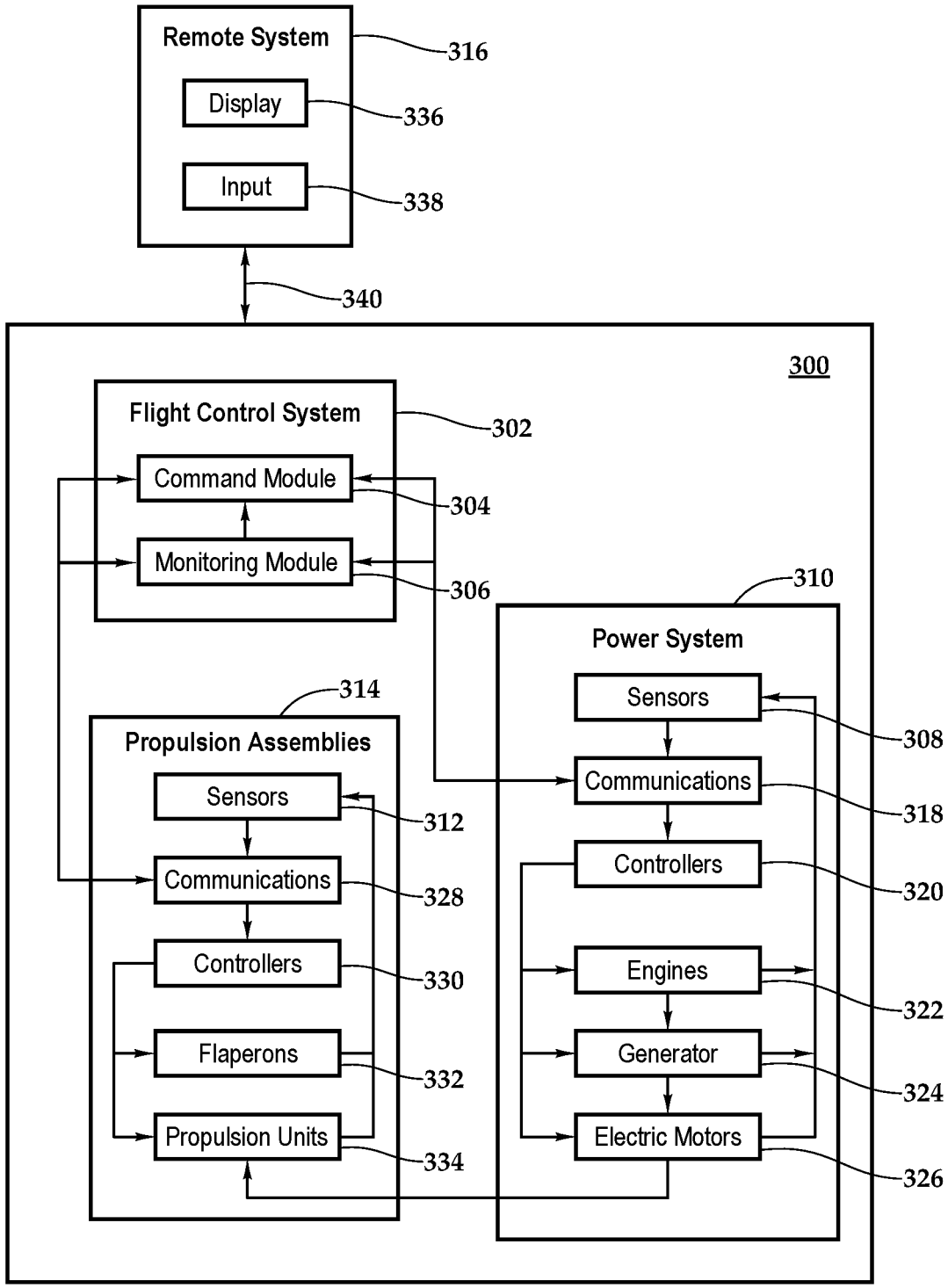
FIG. 7 is a systems diagram of a cargo transportation system having perimeter propulsion in accordance with embodiments of the present disclosure.

Referring to FIG. 7 in the drawings, a systems diagram of an aircraft of the present disclosure is generally designated 300. As discussed herein, the aircraft of the present disclosure may be operated autonomously responsive to commands generated by a flight control system 302. In the illustrated embodiment, flight control system 302 includes a command module 304 and a monitoring module 306. It is to be understood by those having ordinary skill in the art that these and other modules executed by flight control system 302 may be implemented in a variety of forms including hardware, software, firmware, special purpose processors and combinations thereof. Flight control system 302 receives input from a variety of sources including sensors 308 of power system 310 and sensors 312 of propulsion assemblies 314. Flight control system 302 may also receive input from external sources such as remote system 316, global positioning systems and the like. In the illustrated embodiment, power system 310 includes sensors 308, communications 318, controllers 320, engines 322, generator 324, electric motors 326 and other components required for power generation that are known to those skilled in the art. In addition, each propulsion assemblies 314 includes sensors 312, communications 328, controllers 330, flaperons 332, propulsion unit 334 and other components required for thrust generation that are known to those skilled in the art.

In one operational example, flight control system 302 may receive a mission from an external source, such as a command and control station, to deliver a military payload to a desired location. Once the payload is secured to cargo platform 12 using, for example, straps coupled to tie down anchors 16, flight control system 302 may autonomously control all aspects of flight of aircraft 10. During the various operating modes of aircraft 10 including vertical takeoff, hover, forward flight, lateral flight and landing, to name a few, command module 304 provides commands to controllers 318 of power system 310 and controllers 330 of propulsion assemblies 314 to establish the desired vertical lift and lateral thrust from each propulsion assembly, as discussed herein. For example, these commands may include rotational speed for engines 322, eccentricity of propulsion units 314, position of flaperons 332 and the like. Flight control system 302 receives feedback from sensors 308 of power system 310 and sensors 312 of propulsion assemblies 314. This feedback is processes by monitoring module 306, which supplies correction data and other information to command module 304. Monitoring module 306 preferably receives and processes information from additional aircraft sensors (not shown), such as positioning sensors, attitude sensors, speed sensors, environmental sensors, fuel sensors, temperature sensors, location sensors and the like. Monitoring module 306 provides the processed information to command module 304 to further enhance autonomous flight control capabilities.

Some or all of the autonomous control capability of flight control system 302 may be augmented or supplanted by remote flight control system 316. Remote system 316 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 316 communicates with flight control system 302 via a communication link 340 that may include both wired and wireless connections.

Remote system 316 preferably includes one or more display devices 336 configured to display information relating to one or more aircraft of the present disclosure. Display devices 336 may be configured in any suitable form, including, for example, liquid crystal displays, light emitting diode displays, cathode ray tube displays or any suitable type of display. Remote system 316 may also include audio output and input devices such as a microphone, speakers and/or an audio port allowing an operator to communicate with, for example, an operator of another remote system of the present disclosure. The display device 336 may also serve as a input device 338 if a touch screen display implementation is used, however, other input devices, such as a keyboard or joysticks, may alternatively be used to allow an operator to provide control commands to an aircraft being operated responsive to remote control.

Figure 8:
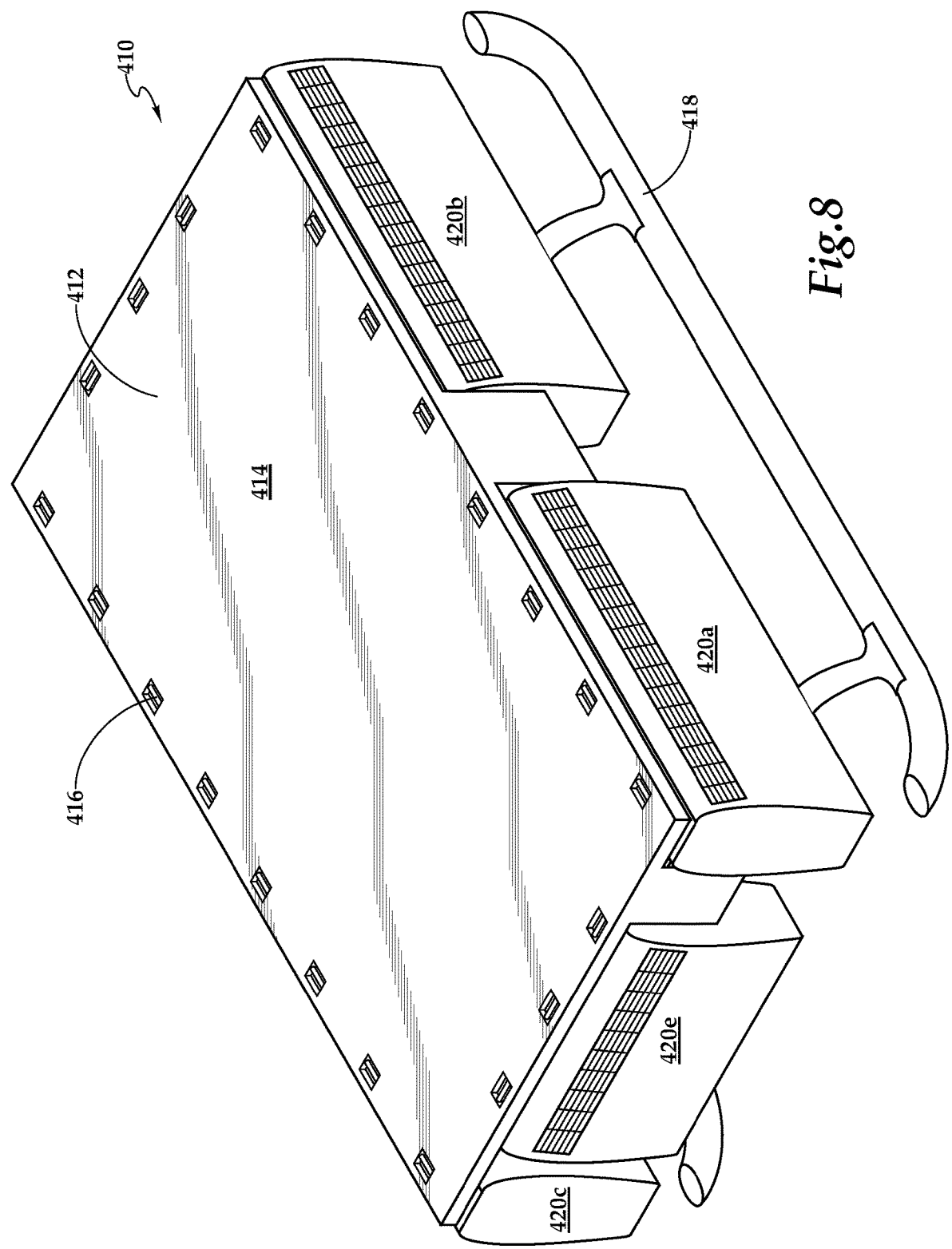
FIG. 8 is a schematic illustration of a cargo transportation system having perimeter propulsion in accordance with embodiments of the present disclosure.

Referring to FIG. 8 in the drawings, a cargo transportation system is schematically illustrated and referred to herein as aircraft 410. Aircraft 410 is preferably an unmanned aircraft system (UAS) capable of VTOL and directional flight operations. Aircraft 410 includes a cargo platform 412 depicted as having generally planar upper surface 414 operable the receive and support cargo items including military pallets, in which case, cargo platform 412 may preferably be 88 inches wide by 108 inches long. In the illustrated embodiment, cargo platform 412 includes a plurality of tie down anchors 416 to which straps, ropes, chains, cargo hooks or other tie down systems may be coupled to secure cargo to upper surface 414 of cargo platform 412. In the illustrated embodiment, aircraft 410 includes landing skids 418 which are preferably coupled to a lower surface of cargo platform 412.

Aircraft 410 includes a propulsion system that is disposed about the perimeter of cargo platform 412. In the illustrated embodiment, the propulsion system includes a plurality of propulsion assemblies including two port propulsion assemblies 420a, 420b, two starboard propulsion assemblies, only starboard propulsion assembly 420c being visible, a front propulsion assembly 420e and an aft propulsion assembly, not visible, that provide vertical lift and directional thrust for aircraft 410. Each of the propulsion assemblies includes one or more propulsion units in the form of variable speed cross-flow fans. As illustrated, the propulsion assemblies are generally symmetrically positioned about the perimeter of cargo platform 412. This arrangement is beneficial for aircraft stability in VTOL operations including pitch, roll and yaw control as well as for directional flight control including forward, aft and lateral flight operations, as discussed herein. In addition, as the illustrated propulsion assemblies have lateral air inlets, cargo platform 412 covers the top of the propulsion assemblies enabling a larger upper surface 414 or a smaller overall aircraft footprint.

Aircraft 410 includes a power system that is preferably disposed within cargo platform 412. The power system may be similar to power system 24 discussed herein including redundant internal combustion engines, liquid fuel storage, an electric generator, batteries and a plurality of electric motors that drive the propulsion assemblies. Aircraft 410 also has a flight control system similar to flight control system 34 discussed herein, such as a triply redundant digital flight control system. The flight control system communicates via a wired and/or wireless protocol with the power system and the propulsion assemblies to individually and independently control the operations thereof. The flight control system may autonomously control all aspects of flight operation for aircraft 410 and/or the flight control system may be operable to communicate with one or more remote stations that may be operable to receive flight data from and provide commands to the flight control system to enable remote flight control over some or all aspects of flight operation for aircraft 410.

Figure 9:
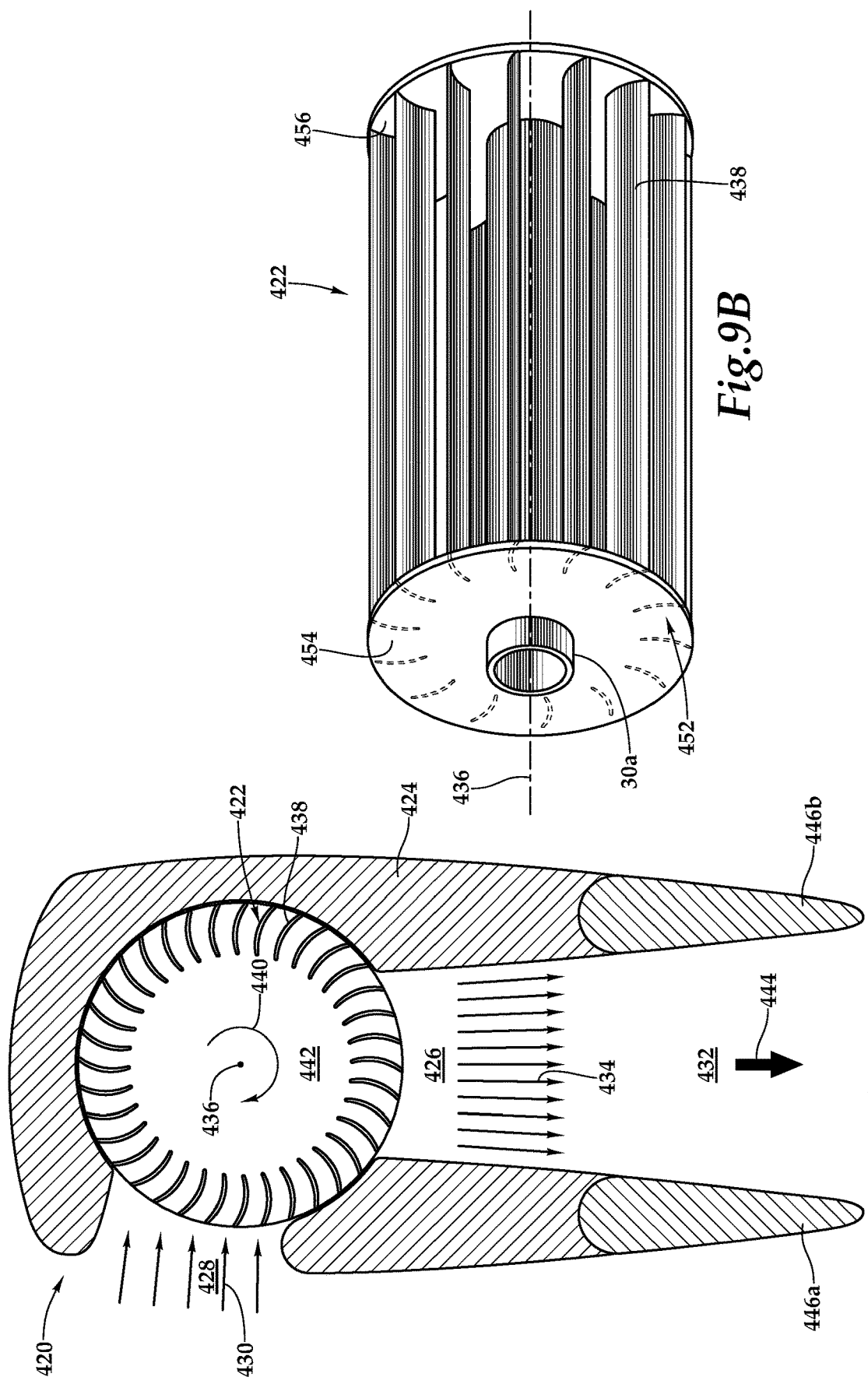
FIGS. 9A-9B are views of a propulsion system and a variable speed cross-flow fan for use in a cargo transportation system having perimeter propulsion in accordance with embodiments of the present disclosure.

Referring next to FIGS. 9A-9B of the drawings, a propulsion assembly 420 having a variable speed cross-flow fan 422 will now be described. Propulsion assembly 420 includes a housing 424 that defines an airflow channel 426 having an air inlet 428 for incoming air 430 and an air outlet 432 for outgoing air 434. In the illustrated embodiment, air inlet 428 is angularly offset relative to air outlet 432 by approximately 90 degrees. As best seen in FIG. 9B, cross-flow fan 422 includes a cross-flow fan assembly 452 including driver plates 454, 456 which are coupled to drive shaft 30a and are rotatable therewith about a longitudinal axis 436. Drive shaft 30a is part of a drive system used to provide rotational energy to cross-flow fan assembly 452 and is preferably coupled to an electric motor, such as electric motor 30, and controlled by flight control system 34. Cross-flow fan assembly 452 includes a plurality of blades 438 that are fixably coupled between driver plates 454, 456. As illustrated, blades 438 are disposed radially outwardly from longitudinal axis 436 such that blades 438 follow a generally circular path of travel when cross-flow fan assembly 452 rotates about longitudinal axis 436.

Cross-flow fan 422 is mounted longitudinally within housing 424 such that the radial outer tips of blades 438 are positioned with a close fitting relationship within airflow channel 426 between air inlet 428 and air outlet 432 to provide efficient airflow therethrough. In the illustrated embodiment, blades 438 have a torus shape with the chords of the blades being generally radially oriented relative to longitudinal axis 436 and with the pitch of blades 438 being constant. The gaps between the generally radially oriented blades 438 proximate air inlet 428 provide an entry path for incoming air 430 while the gaps between the generally radially oriented blades 438 proximate air outlet 432 provide an exit path for outgoing air 434. For example, when cross-flow fan 422 is rotating clockwise as indicated by arrow 440, incoming air 430 entering cross-flow fan 422 by passing through the gaps between blades 438 proximate air inlet 428, the air then travels through the central region 442 of cross-flow fan 422 before exiting cross-flow fan 422 by passing through the gaps between blades 438 proximate air outlet 432. Cross-flow fan 422 thus acts like a two stage compressor generating vertical lift as indicated by thrust arrow 444 and the transformation of low-density incoming air 430 to high-density outgoing air 434.

The magnitude of the thrust output is determined by the rotational speed of cross-flow fan 422, which is controlled by the flight control system. In addition, the flight control system is operable to control the position of flaperons 446a, 446b to direct outgoing air 434 enabling thrust vectoring as discussed herein. By individually and independently controlling the magnitude of the thrust output and the direction of the thrust vector of each cross-flow fan 422, the flight control system is operable to control vertical lift and directional thrust for aircraft 410. In addition, the thrust vectoring capability makes aircraft 410 more stable, responsive and maneuverable in VTOL and directional flight, as discussed herein.

Figure 10:
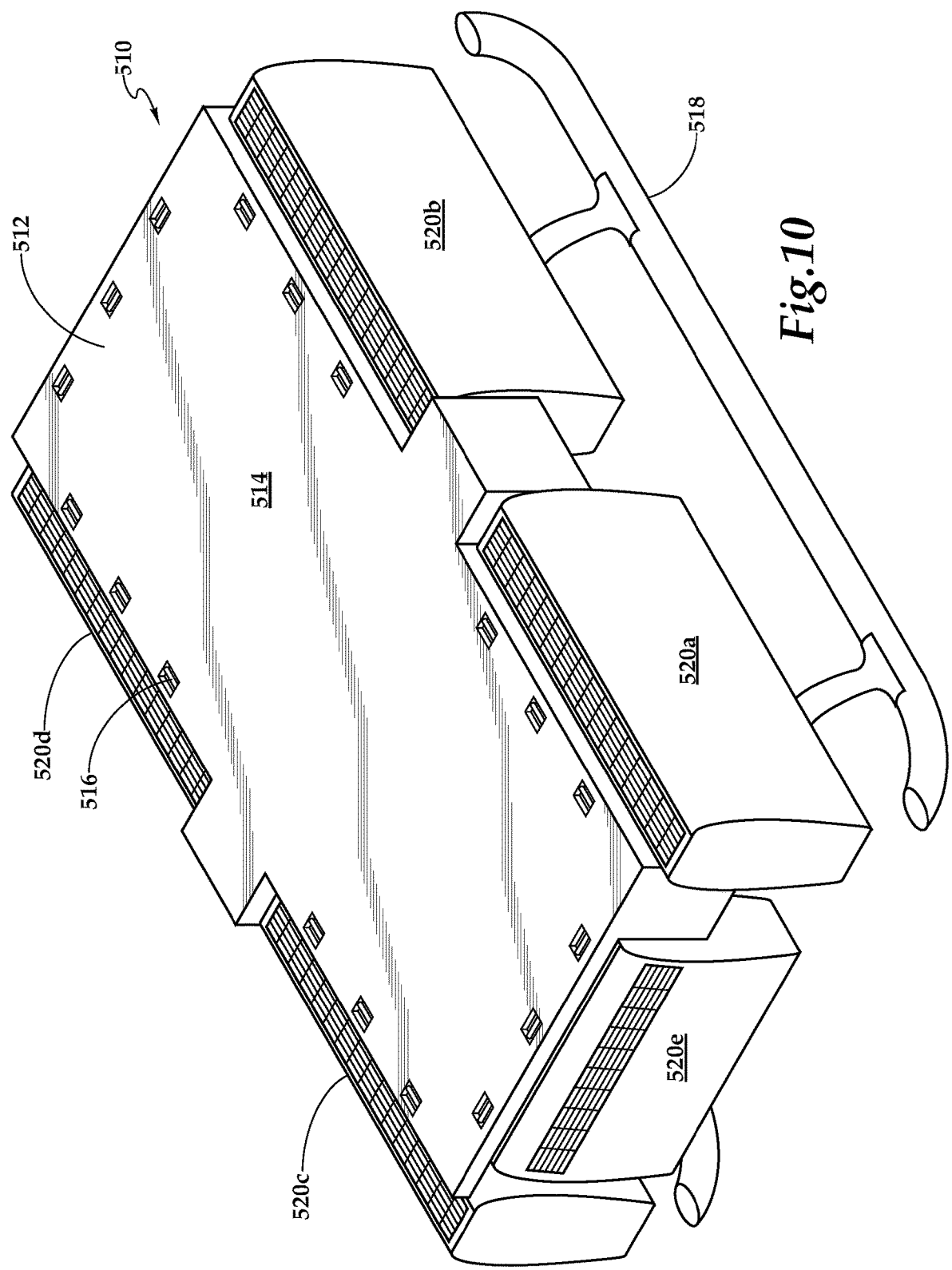
FIG. 10 is a schematic illustration of a cargo transportation system having perimeter propulsion in accordance with embodiments of the present disclosure.

Referring to FIG. 10 in the drawings, a cargo transportation system is schematically illustrated and referred to herein as aircraft 510. Aircraft 510 is preferably an unmanned aircraft system (UAS) capable of VTOL and directional flight operations. Aircraft 510 includes a cargo platform 512 depicted as having generally planar upper surface 514 operable the receive and support cargo items including military pallets, in which case, cargo platform 512 may preferably be 88 inches wide by 108 inches long. In the illustrated embodiment, cargo platform 512 includes a plurality of tie down anchors 516 to which straps, ropes, chains, cargo hooks or other tie down systems may be coupled to secure cargo to upper surface 514 of cargo platform 512. In the illustrated embodiment, aircraft 510 includes landing skids 518 which are preferably coupled to a lower surface of cargo platform 512.

Aircraft 510 includes a propulsion system that is disposed about the perimeter of cargo platform 512. In the illustrated embodiment, the propulsion system includes a plurality of propulsion assemblies including two port propulsion assemblies 520a, 520b, two starboard propulsion assemblies 520c, 520d, a front propulsion assembly 520e and an aft propulsion assembly (not visible) that provide vertical lift and directional thrust for aircraft 510. Port propulsion assemblies 520a, 520b and starboard propulsion assemblies 520c, 520d, each include one or more propulsion units in the form of variable pitch cross-flow fans, such as cross-flow fans 22, 50, 100 discussed herein. Front propulsion assembly 520e and the aft propulsion assembly, each include one or more propulsion units in the form of variable speed cross-flow fans such, as cross-flow fan 422 discussed herein. As illustrated, the propulsion assemblies are generally symmetrically positioned about the perimeter of cargo platform 512. This arrangement is beneficial for aircraft stability in VTOL operations including pitch, roll and yaw control as well as for directional flight control including forward, aft and lateral flight operations, as discussed herein.

Aircraft 510 includes a power system that is preferably disposed within cargo platform 512. The power system may be similar to power system 24 discussed herein including redundant internal combustion engines, liquid fuel storage, an electric generator, batteries and a plurality of electric motors that drive the propulsion assemblies. Aircraft 510 also has a flight control system similar to flight control system 34 discussed herein, such as a triply redundant digital flight control system. The flight control system communicates via a wired and/or wireless protocol with the power system and the propulsion assemblies to individually and independently control the operations thereof. The flight control system may autonomously control all aspects of flight operation for aircraft 510 and/or the flight control system may be operable to communicate with one or more remote stations that may be operable to receive flight data from and provide commands to the flight control system to enable remote flight control over some or all aspects of flight operation for aircraft 510.

Figure 11:
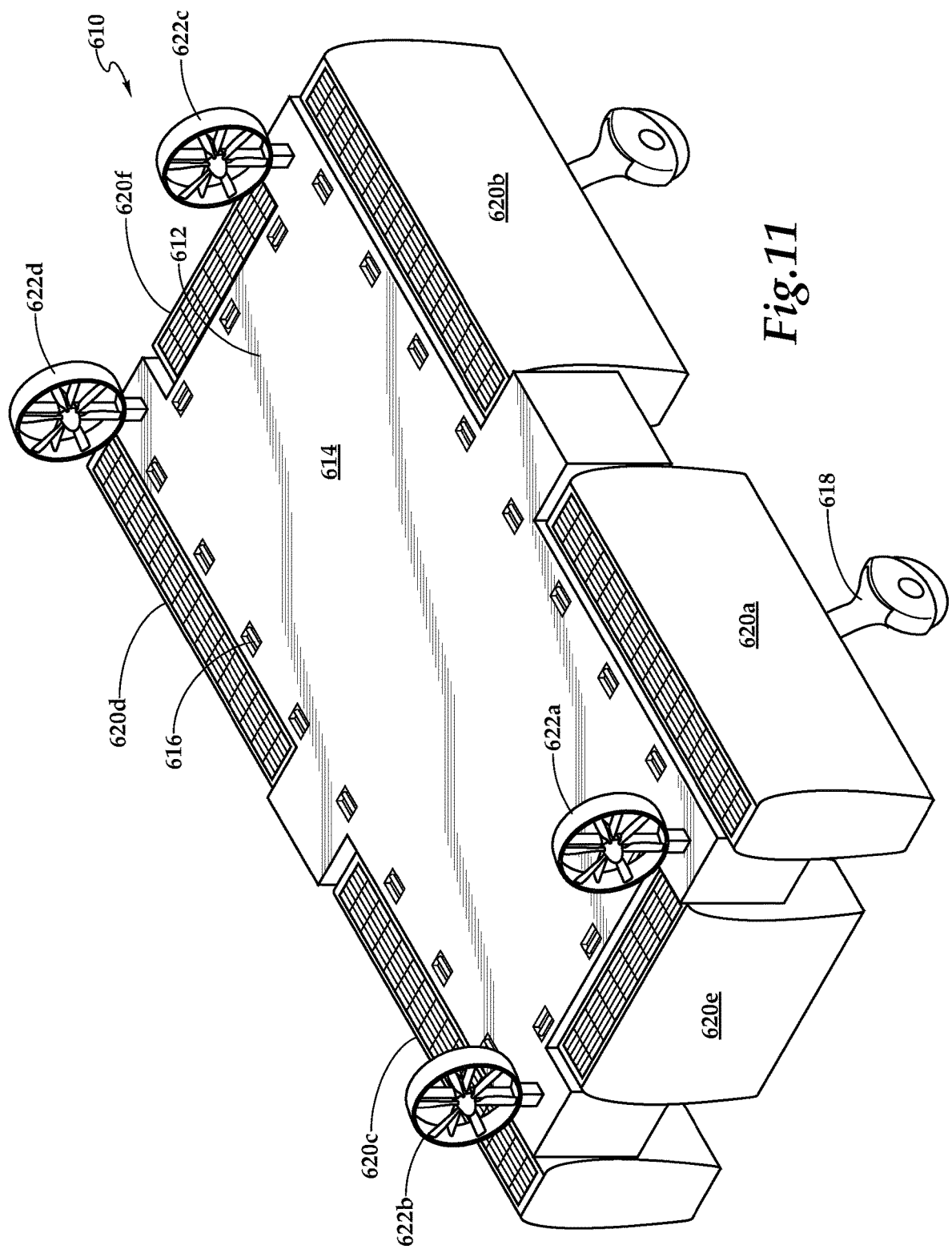
FIG. 11 is a schematic illustration of a cargo transportation system having perimeter propulsion in accordance with embodiments of the present disclosure.

Referring to FIG. 11 in the drawings, a cargo transportation system is schematically illustrated and referred to herein as aircraft 610. Aircraft 610 is preferably an unmanned aircraft system (UAS) capable of VTOL and directional flight operations. Aircraft 610 includes a cargo platform 612 depicted as having generally planar upper surface 614 operable the receive and support cargo items including military pallets, in which case, cargo platform 612 may preferably be 88 inches wide by 108 inches long. In the illustrated embodiment, cargo platform 612 includes a plurality of tie down anchors 616 to which straps, ropes, chains, cargo hooks or other tie down systems may be coupled to secure cargo to upper surface 614 of cargo platform 612. In the illustrated embodiment, aircraft 610 includes landing gear in the form of landing struts 618 with wheels to aid in ground operations of aircraft 610.

Aircraft 610 includes a propulsion system that is disposed about the perimeter of cargo platform 612. In the illustrated embodiment, the propulsion system includes a plurality of propulsion assemblies including two port propulsion assemblies 620*a*, 620*b*, two starboard propulsion assemblies 620*c*, 620*d*, a front propulsion assembly 620*e* and an aft propulsion assembly 620*f* that provide vertical lift and directional thrust for aircraft 610. The propulsion assemblies each include one or more propulsion units in the form of variable pitch cross-flow fans, such as cross-flow fans 22, 50, 100 discussed herein. As illustrated, the propulsion assemblies are generally symmetrically positioned about the perimeter of cargo platform 612. This arrangement is beneficial for aircraft stability in VTOL operations including pitch, roll and yaw control as well as for directional flight control including forward, aft and lateral flight operations, as discussed herein. In addition, aircraft 610 includes a plurality of propulsors depicted as ducted fans 622*a*, 622*b*, 622*c*, 622*d* that provide additional directional thrust for forward, aft and lateral flight, such as to increase the maximum directional speed of aircraft 610 and/or reduce the reliance on thrust vectoring for directional thrust. Ducted fans 622*a*, 622*b*, 622*c*, 622*d* may be fixed to provide substantially forward thrust or may be rotatable to provide thrust in multiple directions relative to aircraft 610. Preferably, ducted fans 622*a*, 622*b*, 622*c*, 622*d* are electrically operated.

Aircraft 610 includes a power system that is preferably disposed within cargo platform 612. The power system may be similar to power system 24 discussed herein including redundant internal combustion engines, liquid fuel storage, an electric generator, batteries and a plurality of electric motors that drive the propulsion assemblies. Aircraft 610 also has a flight control system similar to flight control system 34 discussed herein, such as a triply redundant digital flight control system. The flight control system communicates via a wired and/or wireless protocol with the power system, the propulsion assemblies to individually and independently control the operations thereof and the propulsors to individually and independently control the operations thereof. The flight control system may autonomously control all aspects of flight operation for aircraft 610 and/or the flight control system may be operable to communicate with one or more remote stations that may be operable to receive flight data from and provide commands to the flight control system to enable remote flight control over some or all aspects of flight operation for aircraft 610.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A cargo transportation system comprising:
    a cargo platform having an upper surface and a perimeter;
    a propulsion system disposed about the perimeter and below the upper surface of the cargo platform, the propulsion system including a plurality of thrust vectoring propulsion assemblies, each propulsion assembly including a variable pitch cross-flow fan disposed within a housing defining an airflow channel having an air inlet for incoming air and an air outlet for outgoing air, the housing including a pair of oppositely disposed flaperons proximate the air outlet, the outgoing air operable to generate vertical thrust, the flaperons configured to generate variable directional thrust responsive to rotation thereof;
    a power system at least partially disposed within the cargo platform, the power system providing energy to drive the propulsion system; and
    a flight control system operably associated with the propulsion system and the power system.

2. The cargo transportation system as recited in claim 1 wherein the upper surface of the cargo platform is a generally planar upper surface.

3. The cargo transportation system as recited in claim 1 further comprising a plurality of tie down anchors coupled to the cargo platform.

4. The cargo transportation system as recited in claim 1 wherein the variable pitch cross-flow fans are operable to generate variable thrust.

5. The cargo transportation system as recited in claim 1 wherein each of the variable pitch cross-flow fans further comprises:
    a cross-flow fan assembly having a longitudinal axis and including first and second driver plates having a plurality of blades rotatably mounted therebetween, the blades disposed radially outwardly from the longitudinal axis such that the blades travel in a generally circular path when the cross-flow fan assembly rotates about the longitudinal axis, the plurality of blades moveable between a plurality of pitch angle configurations; and
    a control assembly operably associated with the cross-flow fan assembly, the control assembly operable to change the pitch angle configuration of the plurality of blades to generate variable thrust.

6. The cargo transportation system as recited in claim 1 wherein, for each propulsion assembly, the air inlet and the air outlet of the airflow channel are generally inline.

7. The cargo transportation system as recited in claim 1 further comprising one or more propulsors coupled to the cargo platform operable to generate at least forward thrust.

8. The cargo transportation system as recited in claim 1 wherein the power system further comprises at least one of an electric power system or an internal combustion power system.

9. The cargo transportation system as recited in claim 1 wherein the power system further comprises at least one of a hybrid internal combustion and electric power system or a hybrid internal combustion and hydraulic power system.

10. A cargo transportation system comprising:
a cargo platform having an upper surface and a perimeter;
a propulsion system disposed about the perimeter and below the upper surface of the cargo platform, the propulsion system including a plurality of thrust vectoring propulsion assemblies, each propulsion assembly including a variable pitch cross-flow fan disposed within a housing defining an airflow channel having an air inlet for incoming air and an air outlet for outgoing air that are generally inline, the housing including a pair of oppositely disposed flaperons proximate the air outlet, the outgoing air operable to generate variable vertical thrust, the flaperons configured to generate variable directional thrust responsive to rotation thereof;
a power system at least partially disposed within the cargo platform, the power system providing energy to drive the propulsion system; and
a flight control system operably associated with the propulsion system and the power system.

11. The cargo transportation system as recited in claim 10 wherein each of the variable pitch cross-flow fans further comprises:
a cross-flow fan assembly having a longitudinal axis and including first and second driver plates having a plurality of blades rotatably mounted therebetween, the blades disposed radially outwardly from the longitudinal axis such that the blades travel in a generally circular path when the cross-flow fan assembly rotates about the longitudinal axis, the plurality of blades moveable between a plurality of pitch angle configurations; and
a control assembly operably associated with the cross-flow fan assembly, the control assembly operable to change the pitch angle configuration of the plurality of blades to generate variable thrust.

12. A cargo transportation system comprising:
a cargo platform having an upper surface and a perimeter;
a propulsion system disposed about the perimeter and below the upper surface of the cargo platform, the propulsion system including a plurality of thrust vectoring propulsion assemblies including at least first and second variable speed cross-flow fans each disposed within a housing defining an airflow channel having an air inlet for incoming air and an air outlet for outgoing air that are angularly offset, the housing including a pair of oppositely disposed flaperons proximate the air outlet, the outgoing air operable to generate variable vertical thrust, the flaperons configured to generate variable directional thrust responsive to rotation thereof and at least first and second variable pitch cross-flow fans each disposed within a housing defining an airflow channel having an air inlet for incoming air and an air outlet for outgoing air that are generally inline, the housing including a pair of oppositely disposed flaperons proximate the air outlet, the outgoing air operable to generate variable vertical thrust, the flaperons configured to generate variable directional thrust responsive to rotation thereof;
a power system at least partially disposed within the cargo platform, the power system providing energy to drive the propulsion system; and
a flight control system operably associated with the propulsion system and the power system.

13. The cargo transportation system as recited in claim 12 wherein each of the variable speed cross-flow fans further comprises:
a cross-flow fan assembly having a longitudinal axis and including first and second driver plates having a plurality of blades fixably mounted therebetween, the blades disposed radially outwardly from the longitudinal axis such that the blades travel in a generally circular path when the cross-flow fan assembly rotates about the longitudinal axis.

14. The cargo transportation system as recited in claim 12 wherein each of the variable pitch cross-flow fans further comprises:
a cross-flow fan assembly having a longitudinal axis and including first and second driver plates having a plurality of blades rotatably mounted therebetween, the blades disposed radially outwardly from the longitudinal axis such that the blades travel in a generally circular path when the cross-flow fan assembly rotates about the longitudinal axis, the plurality of blades moveable between a plurality of pitch angle configurations; and
a control assembly operably associated with the cross-flow fan assembly, the control assembly operable to change the pitch angle configuration of the plurality of blades to generate variable thrust.

15. The cargo transportation system as recited in claim 12 further comprising one or more propulsors coupled to the cargo platform operable to generate at least forward thrust.

16. The cargo transportation system as recited in claim 10 further comprising one or more propulsors coupled to the cargo platform operable to generate at least forward thrust.

* * * * *